July 5, 1949.　　　　H. J. WOOCK　　　　2,475,536
RENEWABLE PLOW EDGE
Filed Dec. 4, 1944
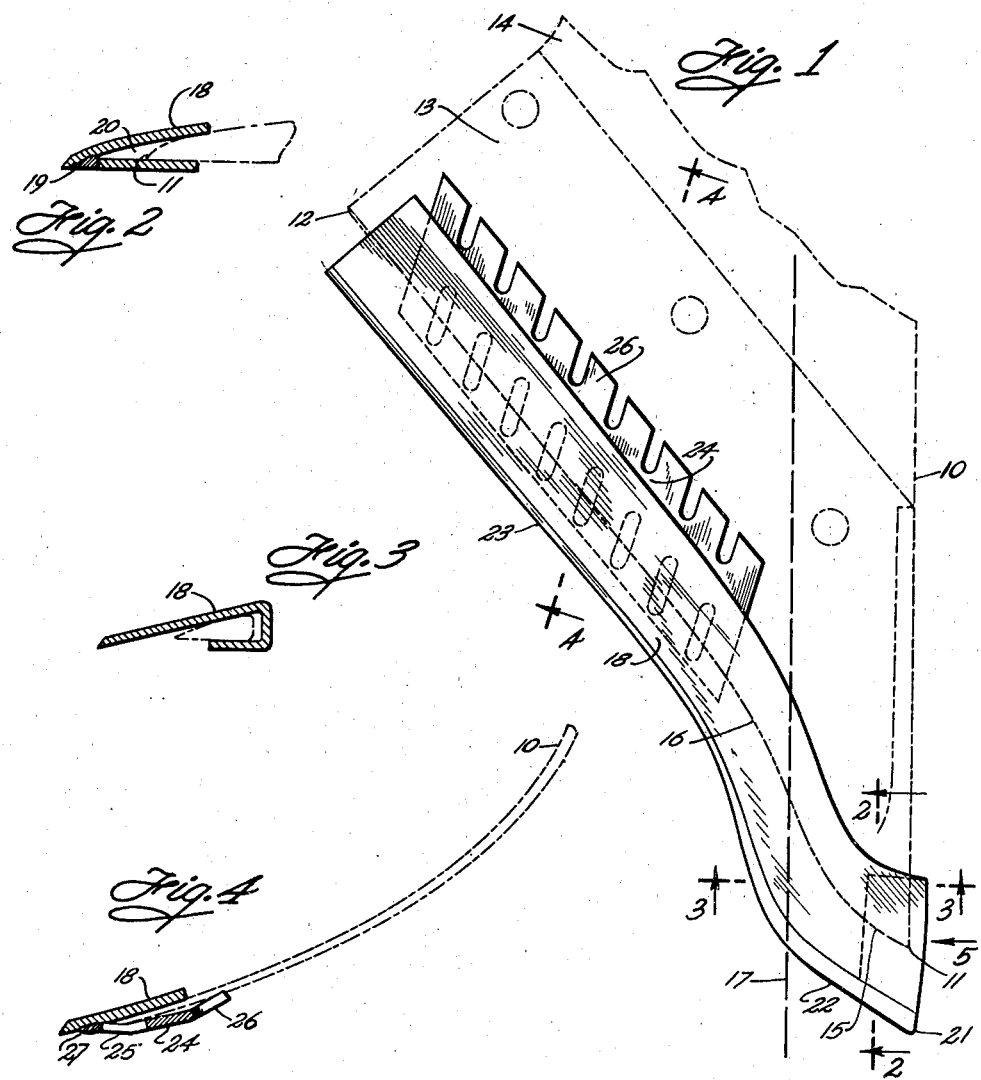
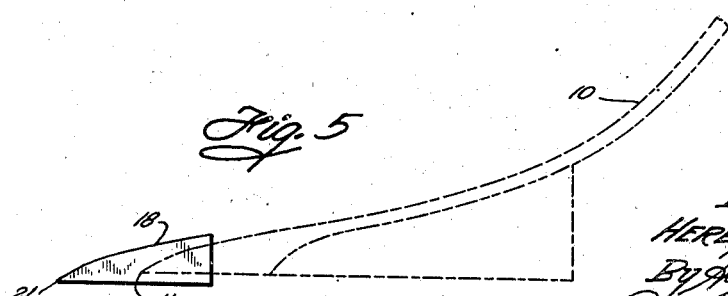
Inventor
HERBERT J. WOOCK
By Fitzgerald and Reilly
Attorneys Patented July 5, 1949

2,475,536

UNITED STATES PATENT OFFICE 2,475,536

RENEWABLE PLOW EDGE

Herbert J. Woock, Alhambra, Calif., assignor to Herbert E. Linden, Los Angeles, Calif.

Application December 4, 1944, Serial No. 566,474

2 Claims. (Cl. 97—125)

This invention relates to a renewable cutting edge for plowshares, and is primarily designed for use with the share of a moldboard plow.

An object of the invention is to provide an improved renewable cutting edge for a moldboard plow so that when the edge becomes worn or damaged, it may be easily removed, discarded, and replaced by a new renewable cutting edge.

Heretofore, a number of renewable cutting edges for plowshares have been designed and used to a limited extent consisting of a generally elongated blade conforming in shape to the edge of the plowshare and having spring fingers which cooperate to clamp the blade on the plowshare so that its edge is disposed in advance of the edge of the plowshare. Frequently, these blades are equipped at their forward ends with sockets or pockets designed to receive the point of the plowshare. An objection to the renewable cutting edges heretofore provided has been that the application of the renewable edge to the conventional plow disturbs or affects the line of draft. The conventional moldboard plow is a nicely designed instrument designed with relation to the line of draft so that the plow will not be abnormally pressed against the landside which would result in excessive friction and consequently require the application of additional power to overcome such friction. Heretofore, when renewable edges have been applied to moldboard plows they become effective to disturb the line of draft and cause the plow to be swung against the landside with abnormal pressure which was noticeable in the amount of gasoline consumed by the tractor if the plow was being pulled by such an instrument. For this reason, renewable edges for plowshares have not met with any great favor in that the advantageous ability to renew the edge of the plowshare resulted in or was compensated by the disadvantageous additional friction occasioned by the altering of the draft to cause the plow to be abnormally pressed against the landside. As the advantage was virtually balanced by the disadvantage noticeable in gasoline consumption renewable plowshare edges have not met with complete favor. Manufacturers of renewable edges for plowshares have consequently been forced to recommend or advise the purchaser that on applying a renewable edge to his conventional plow he should adjust the draft of the plow to meet with the changed conditions occasioned by the application of the renewable edge. Most users of plows have been unfamiliar with how the draft might be adjusted and even when they undertook to adjust the draft they had little information in the way of a guide as to the extent that the adjustment should be made.

A primary object of this invention is to provide an improved renewable edge for plowshares which, when applied to the conventional moldboard plow, will not disturb the draft and which will not cause the plow to be swung against the landslide with abnormal pressure. Consequently, a plow to which the renewable edge embodying the present invention is applied can be pulled through the earth just as easily as the conventional plow with no more gasoline consumption and it is unnecessary for the purchaser to adjust the draft of the plow.

Another object of the invention is to provide a renewable edge having a novel, simple, and more advantageous set of clamping fingers which will cause the blade to be clamped and thus attached to the plowshare more firmly.

With the foregoing and other objects in view, which will be made manifest in the following detailed description and specifically pointed out in the appended claims, reference is had to the accompanying drawings illustrating the invention, wherein:

Figure 1 is a top plan view of the renewable edge embodying the present invention and illustrating a portion of the conventional moldboard plow to which the edge may be applied, the moldboard plow being illustrated in phantom lines;

Figs. 2, 3, and 4 are sectional views taken substantially upon the lines 2—2, 3—3, and 4—4, respectively; and Fig. 5 is a view in side elevation taken substantially in the direction of the arrow 5 upon Fig. 1.

Referring to the accompanying drawings wherein similar reference characters designate similar parts throughout, the conventional moldboard plow has a landside indicated at 10, a point 11, and a heel 12. The plowshare is generally indicated at 13 and is fastened to the moldboard 14. Near the point 11 there is usually what may be termed an advance cutting edge 15 which is disposed somewhat in advance of the balance of the cutting edge 16 that extends to the heel 12. The line of draft of the conventional plow is usually substantially parallel to the landside and is represented on the drawing by the line 17. Usually, the length of the advance cutting edge 15 adjacent the point 11 is approximately 2″ although this may vary slightly. From this advance cutting edge the edge of the share 13 curves rearwardly until it merges with the remainder of the cutting edge indicated at 16.

The renewable edge embodying the present invention comprises a suitable elongated blade 18 which may be of substantially the same length as the plowshare 13. The forward end of this blade may be reversely bent upon itself and welded as indicated at 19 to form a pocket or socket 20 that receives the point 11. This blade provides a point 21 disposed directly forward of the point 11. It is characterized by the fact that its advance cutting edge 22 is materially greater in length than the advance cutting edge 15 of the plowshare. Thus, if the advance cutting edge 15 is approximately 2", I make the advance cutting edge 22 approximately 4" to 4½" in length. From this advance cutting edge the edge of the blade curves rearwardly and merges with the remainder of the edge indicated at 23 disposed forwardly of the edge 16 and substantially parallel thereto. On the underside of the blade there is secured a series of clamping fingers preferably formed by metal strip having a central web portion 24 and a series of lower fingers 25 and a series of upper fingers 26. The ends of the lower fingers are attached to the bottom or underside of the blade, such as by welds 27. While the fingers might be individually made and attached to the blade, I prefer to have them stamped from a single section of metal and be thus integrally connected so that they will mutually cooperate with each other in clamping on the plowshare 13 and may be handled as a single unit in welding them at 27 to the blade 18.

As will be noted from an inspection of Fig. 4, these fingers are so shaped and bent that their intermediate portions represented by the web 24 are normally spaced slightly from the underside of the plowshare 13. In other words, the ends 26 are bent upwardly so that the extreme ends will press firmly against the underside of the plowshare and hold the intermediate portions or web 24 in spaced relation thereto.

Renewable edges heretofore patented, manufactured, and sold have universally attempted to cause the blade 18 to present a cutting edge from point to heel in parallelism with the cutting edge of the plowshare and where the advance cutting edge 15 of the plowshare was 2" in length the renewable edge presented an advance cutting edge 22 of the same length. When such renewable cutting edges were applied to conventional plows the renewable edge caused the plowshare to present a forward edge of increased thickness represented by the thickness of the blade 18 and the thickness of the fingers as well as the intervening thickness of the plowshare edge over which the renewable edge was applied. This increased thickness on being drawn through the earth consequently imposed additional drag on the plow between the line of draft 17 and the heel 12. Consequently, as there was greater resistance to drawing the plow through the earth on the heel-side of the line of draft 17, the balance of the plow was disturbed in that this additional drag tended to swing the plow against the land-side with the disadvantages above explained.

In the improved renewable edge wherein I materially increase the length of the advance cutting edge 22 over the length of the advance cutting edge 15, I counterbalance the drag created by the additional thickness between the line of draft 17 and the heel 12 by the increased length of the advance cutting edge which is between the line of draft 17 and the landside. Thus, the additional resistance occasioned by the thickness of the renewable cutting edge between the line of draft and the heel is balanced by the additional resistance between the line of draft and the landside due to the additional length of the advance cutting edge. By means of the present construction the user on applying the cutting edge to the conventional plow is not required to adjust the draft of the plow nor will the plow be swung with abnormal pressure against the landside. When the present renewable edge is applied to the plow the line of draft remains the same in that increased resistance on both sides of the line of draft remains balanced. While the renewable cutting edge does present additional resistance to being drawn through the earth over the resistance of the plowshare 13 because of the increased thickness, this resistance is so slight as to be negligible as compared with resistance occasioned by swinging the plow with abnormal pressure against the landside.

Heretofore, renewable plow edges have had their clamping fingers attached to the edge by either being welded thereto or integrally formed therefrom and these fingers have been arranged perfectly parallel to the plane of the blade. With such an arrangement the edge of the plowshare being forced against the roots of the fingers would tend to spread these fingers from the blade with the result that the renewable edge was apt to loosen. By the improved construction wherein the free ends of the fingers are bent toward the plane of the blade to hold their intermediate portions in spaced relation thereto this spreading action is eliminated and the fingers are susceptible of individually functioning as stiff springs which press against the plowshare only at their outer or free ends. These fingers will consequently tend to retain the blade on the plowshare continually with resilient clamping action.

From the above-described construction it will be appreciated that an improved renewable edge for plowshares is provided which is so designed that it may be applied to the conventional plowshare without altering the line of draft and without causing the plow to swing and exert abnormal pressure against the landside with attendant disadvantages.

Various changes may be made in the details of construction without departing from the spirit and scope of the invention as defined by the appended claims.

I claim:

1. A renewable edge for plowshares comprising a blade applicable to the share having means providing fingers secured to the blade adapted to cooperate with the blade to clampingly engage the share, said fingers being characterized by their intermediate portions being disposed in spaced relation to the share.

2. A renewable edge for plowshares comprising a blade applicable to the share having means providing fingers secured to the blade adapted to cooperate with the blade to clampingly engage the share, said fingers having their free ends bent inwardly toward the plane of the blade so that when the blade is applied to a plowshare the ends of the fingers will engage the share and portions of the fingers inwardly from the ends will be held in spaced relation thereto.

HERBERT J. WOOCK.

REFERENCES CITED

The following references are of record in the file of this patent:

UNITED STATES PATENTS

| Number | Name | Date |
|---|---|---|
| 1,976,268 | Reynolds | Oct. 9, 1934 |
| 2,016,578 | Reynolds | Oct. 8, 1935 |
| 2,073,801 | Linden | Mar. 16, 1937 |
| 2,085,520 | Weisel | June 29, 1937 |

FOREIGN PATENTS

| Number | Country | Date |
|---|---|---|
| 435,505 | Great Britain | Sept. 23, 1935 |